(12) United States Patent  (10) Patent No.: US 7,527,208 B2
Hammad et al.  (45) Date of Patent: May 5, 2009

(54) BANK ISSUED CONTACTLESS PAYMENT CARD USED IN TRANSIT FARE COLLECTION

(75) Inventors: Ayman Hammad, Pleasanton, CA (US); Phil Dixon, San Diego, CA (US); Brian Triplett, El Dorado Hills, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 140 days.

(21) Appl. No.: 11/566,614

(22) Filed: Dec. 4, 2006

(65) Prior Publication Data

US 2008/0128513 A1  Jun. 5, 2008

(51) Int. Cl.
*G06K 19/06* (2006.01)
(52) U.S. Cl. .................. 235/492; 235/382; 235/382.5
(58) Field of Classification Search .............. 235/492, 235/382, 382.5; 713/172
See application file for complete search history.

(56) References Cited

U.S. PATENT DOCUMENTS

| | | | |
|---|---|---|---|
| 4,736,094 A | 4/1988 | Yoshida | |
| 4,822,985 A | 4/1989 | Boggan et al. | |
| 4,857,893 A | 8/1989 | Carroll | |
| 4,870,259 A | 9/1989 | Boggan et al. | |
| 4,899,036 A | 2/1990 | McCrindle et al. | |
| 4,908,521 A | 3/1990 | Boggan et al. | |
| 4,943,707 A | 7/1990 | Boggan | |
| 5,103,079 A | 4/1992 | Barakai et al. | |
| 5,191,193 A | 3/1993 | Le Roux | |
| 5,286,955 A | 2/1994 | Klosa | |
| 5,337,063 A | 8/1994 | Takahira | |
| 5,360,967 A | 11/1994 | Perkin et al. | |

(Continued)

FOREIGN PATENT DOCUMENTS

AU  683196 B2  10/1997

(Continued)

OTHER PUBLICATIONS

"The NYC Subway Trial | MasterCard® | About the Trial", downloaded from the Internet at http://www.mastercard.com/us/paypass/subway/about/subwaytrial_newsrelease_30Jan2006html on Jun. 11, 2008, pp. 1-2.

(Continued)

*Primary Examiner*—Daniel A Hess
(74) *Attorney, Agent, or Firm*—Townsend and Townsend and Crew LLP

(57) ABSTRACT

An architecture for a contactless smart card or payment device, where the smart card is intended for use in both commerce transaction payment and transit fare payment (or other venue access) environments. The payment device may function as both an electronic wallet for commerce transactions and as a transit system card, for access to and fare payment of transit services. Implementation of both functions may be achieved by use of a dynamic memory management system that permits data for both the payment and transit applications to be stored on the card, with the transit data and storage locations isolated from those used to store data intended for use in paying for commerce transactions. The transit application specific data may include access control data (keys, passwords, identification data) or data required for fare calculations (rates, historical data on system use), for example.

11 Claims, 6 Drawing Sheets

U.S. PATENT DOCUMENTS

| | | | |
|---|---|---|---|
| 5,396,558 | A | 3/1995 | Ishiguro et al. |
| 5,503,774 | A | 4/1996 | Brons et al. |
| 5,562,550 | A | 10/1996 | Chartrand |
| 5,585,614 | A | 12/1996 | VonBallmoos |
| 5,649,118 | A | 7/1997 | Carlisle et al. |
| 5,828,044 | A | 10/1998 | Jun et al. |
| 6,179,205 | B1 | 1/2001 | Sloan |
| 6,216,227 | B1 * | 4/2001 | Goldstein et al. ............ 713/172 |
| 6,970,891 | B1 | 11/2005 | Deo et al. |
| 7,209,757 | B2 | 4/2007 | Naghian et al. |
| 2002/0002534 | A1 | 1/2002 | Davis et al. |
| 2003/0105711 | A1 | 6/2003 | O'Neil |
| 2003/0216927 | A1 | 11/2003 | Sridhar et al. |
| 2004/0139021 | A1 | 7/2004 | Reed et al. |
| 2005/0165695 | A1 | 7/2005 | Berardi et al. |
| 2006/0161435 | A1 | 7/2006 | Atef et al. |
| 2006/0287964 | A1 | 12/2006 | Brown |
| 2008/0054072 | A1 | 3/2008 | Katragadda et al. |
| 2008/0116264 | A1 | 5/2008 | Hammad et al. |
| 2008/0128513 | A1 | 6/2008 | Hammad et al. |
| 2008/0201212 | A1 | 8/2008 | Hammad et al. |

FOREIGN PATENT DOCUMENTS

| | | | |
|---|---|---|---|
| BR | PI9606505 | A | 1/1998 |
| CA | 2197347 | C | 1/1997 |
| CN | 1164073 | | 11/1997 |
| EP | 0254595 | B1 | 1/1988 |
| EP | 795165 | B1 | 9/1997 |
| GB | 2267626 | A | 12/1993 |
| JP | 2001525950 | T2 | 12/2001 |
| KR | 100287012 | B1 | 1/2001 |
| NZ | 306570 | A | 6/1998 |
| WO | WO2006/124808 | A1 | 11/2006 |

OTHER PUBLICATIONS

U.S. Appl. No. 11/680,589, Hammad et al.
U.S. Appl. No. 11/680,592, Hammad et al.
U.S. Appl. No. 11/680,594, Hammad et al.
U.S. Appl. No. 12/022,060, Hammad et al.
American Public Transportation Association, "Account Linked Payment Service Concept White Paper", <http://www.speacq.com/industry/APTA_FSP_ALPS_White_Paper.pdf> (last modified Jan. 25, 2007), 33 pages.
"Metrorail, Washington, D.C.," downloaded from the internet at http://www.en.wikipedia.org, on Jul. 30, 2008, pp. 1-3.
U.S. Appl. No. 11/536,296, entitled, "Mobile Transit Fare Payment," filed on Sep. 28, 2006.

* cited by examiner

BANK ISSUED CONTACTLESS PAYMENT CARD USED IN TRANSIT FARE COLLECTION

CROSS-REFERENCE TO RELATED APPLICATION

Co-pending application Ser. No. 11/536,296, filed on Sep. 28, 2006, and commonly owned by Visa U.S.A. Inc., is hereby incorporated by reference in its entirety.

BACKGROUND OF THE INVENTION

The present invention is directed to apparatuses for the payment and collection of transit fares, and more specifically, to a contactless payment card of the type issued by a bank that may be used as both a commerce transaction payment and transit fare payment device.

Many people regularly commute to work or travel for other purposes using transportation systems. Such systems include public transportation systems, for example, buses, subways, trains, ferries, and the like. Typically, these transportations systems require some form of fare payment at one or more sites of the system. One means of fare payment is the use of some form of payment card, from which a fare can be deducted against a previously established balance, or to which a fare can be applied as a credit type debt to be paid at a later date. However, such payment cards generally require that the user pass the card through a card reader or other mechanism, or hand the card to a transit operator. This requirement is inefficient and undesirable as transit users are often in a hurry, and do not wish to wait in lines or engage in a formal transaction process that may require more time than desired for authentication of the user and approval of the transaction.

The problems encountered in standard payment card systems has led to an interest in the use of contactless "smart" cards or contactless smart chips as part of a fare payment system. A smart card is generally defined as a pocket-sized card (or other portable payment device) that is embedded with either a microprocessor and one or more memory chips, or as one or more memory chips with non-programmable logic. The microprocessor type card typically can implement certain data processing functions, such as to add, delete, or otherwise manipulate information stored in a memory location on the card. In contrast, the memory chip type card (for example, a pre-paid phone card) can only act as a file to hold data that is manipulated by the reading device to perform a pre-defined operation, such as debiting a charge from a pre-established balance held in the memory or secure memory. Smart cards, unlike magnetic stripe cards (such as standard credit cards), can implement a variety of functions and contain a variety of types of information on the card. Therefore, in some applications they do not require access to remote databases for the purpose of user authentication or record keeping at the time of a transaction. A smart chip is a semi-conductor device that is capable of performing most, if not all, of the functions of a smart card, but may be embedded in another device.

Smart cards come in two general varieties; the contact type and the contactless type. A contact type smart card is one that includes contacts which enable access to the data and functional capabilities of the card, typically via some form of terminal or card reader. A contactless smart card is a smart card that incorporates a means of communicating with the card reader or terminal without the need for direct contact. Thus, such cards may effectively be "swiped" by passing them close to the card reader or terminal. Such contactless cards typically communicate with the card reader or terminal using RF (radio-frequency) technology, wherein proximity to an antenna causes data transfer between the card and the reader or terminal. Contactless cards have found uses in banking and other applications, as they may not require removal from one's wallet or pocket in order to complete a transaction. Further, because of the growing interest in such cards, standards have been developed that govern the operation and interfaces for contactless smart cards, such as the ISO 14433 standard.

Both transit and payment applications have adopted the ISO 14443 standard for contactless smart cards. Because of the use of a common standard, there has developed a desire to utilize a bank-issued contactless payment card as both a commerce payment mechanism at a point of sale and as a transit fare payment mechanism. This would provide for two distinct uses of a single contactless smart card (i.e. transit fare collection and retail point of sale). The present invention is directed to, among other things, overcoming certain disadvantages of using a standard contactless payment card and system in a transit environment, some of which will be discussed below.

In transit applications, the speed of the transaction for the user is a primary consideration. This means that the transit fare payment and collection process can not be performed effectively using a standard on-line authentication and approval process, as may be used for a purchase transaction at a retail point of sale through the financial payment network. This presents a difficulty because effective fraud prevention typically requires authentication that the card user is entitled to access the transit system and has sufficient funds for the desired transaction. In addition, different transit systems will typically have different authentication requirements, fare calculations, and ancillary data requirements. This means that a smart card, if desired to be used in a transit environment, must contain the data relevant for the transit system a user wishes to utilize when the user attempts to access the system. This can become a significant problem if a user wishes to utilize more than one transit system, such as two transit agencies within a single geographical area or transit systems in two different cities or locations.

Further, as transit typically involves moving between stations, with different fare calculations and rates required depending upon the actual travel distance, direction, patron category, and/or times of use, fares may need to be computed based on station entry and exit location, direction, mode of travel, category of patron, and possibly time of day. This would require that the smart card terminals/readers at each station or route be able to perform these computations based on data stored and retrieved from a user's card, and subsequent card terminals/readers be able to access data written to the card at previous stations. This places a significant processing burden on the terminals and/or fare processing systems and increases the cost of implementing the infrastructure for such systems. As fare rates and other relevant information generally change over time, this also increases the demands placed upon such systems.

A related issue is the need to protect confidential data that may be used as part of a commerce transaction, when a combined function card is used in a transit fare payment process. The confidential data may include authentication and other forms of identification data that are required for payment in a standard point of sale transaction. However, because of security concerns (either at a fare payment location or within a transit system information processing network), it may be undesirable to permit a transit fare payment process to have access to this data. This can create a problem if a user wishes to link their transit activities to their standard payment account so that transit expenses can be paid for using their payment account, or if they desire to use the payment account to "load" the balance for the transit fare account.

Thus, the transit environment presents several issues that combine to make use of a standard contactless smart card or chip problematic. In addition to those noted, these issues include:

- A need for one card per transit agency or group of cooperating agencies;
- If a contactless payment card is used, it typically lacks the ability to write back to the chip, and data is not available on subsequent transactions to calculate the fare. This adds to the burden of the system having to keep track of card history and calculate the fare in a post processing system rather than at the gate or farebox;
- It may be required that a patron, who is visiting a location or agency for the first time, register their card for use in that system. This may take a physical process of going and doing something before the card may be used in transit at the new location; and
- Each agency or region may utilize a different set of file structures and/or information to handle their fare policy, and a single card may lack the appropriate data formats or encryption capability.

As a result, the disadvantages to using a contactless payment device as issued by a bank or other issuer include the need to preserve the security of authentication and payment account data; the desire to accommodate transit system user's transaction speed expectations; and the need to provision the card with the data required to access and perform fare payment calculations for multiple transit systems.

What is desired is a contactless payment device that is capable of being used as both a transaction payment mechanism and as a transit fare payment or other venue access mechanism, and which overcomes the disadvantages of current approaches.

BRIEF SUMMARY OF THE INVENTION

The present invention is directed to an architecture for a contactless smart card or other contactless payment device, where the payment device is intended for use in both commerce transaction payment and transit fare payment (or other venue access) environments. This enables the payment device to function as both an electronic wallet for commerce transactions and as a transit system card, for access to and fare payment of transit services. In one embodiment, implementation of both functions is achieved by use of a dynamic memory management system that permits data for both the payment applications and transit applications to be stored on the card, with the transit data and storage locations isolated from those used to store data intended for use in paying for commerce transactions. The transit application specific data may include access control data (keys, passwords, identification data) or data required for fare calculations (rates, historical data on system use), for example. Although transit applications are described in detail, other non-payment and/or venue access transactions may be contemplated in addition to transit applications.

The data storage functions of the transit-specific section (or other venue access section) of the card may be altered as needed to accommodate the storage of data for multiple transit systems, and to reflect changes in the transit systems represented on the card. Programming of the transit system specific data may be accomplished by the card vendor, the card issuer, or following issuance of the card to the user. The personal information utilized in a commerce transaction payment (e.g., a personal identification number, account number, etc.) is not accessible to the transit fare payment system, thereby preserving the security of this data. Further, the dual function contactless smart card or payment device of the present invention may also be used to permit access to and payment of fees associated with other venues, such as amusement parks, theaters, museums, etc.

In one embodiment, the present invention is directed to a portable consumer device for use in conducting a transaction. The device includes an interface configured to communicate and exchange data with an element of a transaction processing system, a data storage element partitioned into two regions with the first region dedicated to data for a payment transaction and the second region dedicated to data for a different transaction than the first region, and a control module coupled to the interface and data storage element and configured to control the transfer of data between the interface and data storage element.

In another embodiment, the present invention is directed to a contactless smart card device that includes a first data storage region dedicated to data for a payment transaction and including data for authenticating the payment transaction, where the first data storage region is protected to prevent access by other than the payment transaction. The device also includes a second data storage region dedicated to data for a different transaction than the payment transaction and not containing the data for authenticating the payment transaction, where the second data storage region is dynamically configurable.

In yet another embodiment, the present invention is directed to a method of programming a portable consumer device for use in conducting an access transaction. The method includes accessing data from a first data storage region of the device, the accessed data including data used in a process for authenticating a payment transaction and protected from access by other than the process for authenticating the payment transaction, authenticating the payment transaction, establishing account data for the transaction, where the account data includes account identification data different from the data used in the process for authenticating the payment transaction, cross-referencing the account identification data to at least some of the data used to authenticate the payment transaction, and writing data required to conduct the access transaction to a second storage region of the device, wherein the second storage region is dedicated to data for the access transaction.

Further, the present invention is directed to a method of conducting an access transaction that includes receiving data read from a data storage region of a payment device, where the data includes access transaction account identification data, cross-referencing the access transaction account identification data to payment account identification data, processing the received data and payment account identification data to authorize the access transaction, and communicating the authorization to an agent for the access transaction.

Other objects and advantages of the present invention will be apparent to one of ordinary skill in the art upon review of the detailed description of the present invention and the included figures.

DETAILED DESCRIPTION OF THE INVENTION

Figure 1:
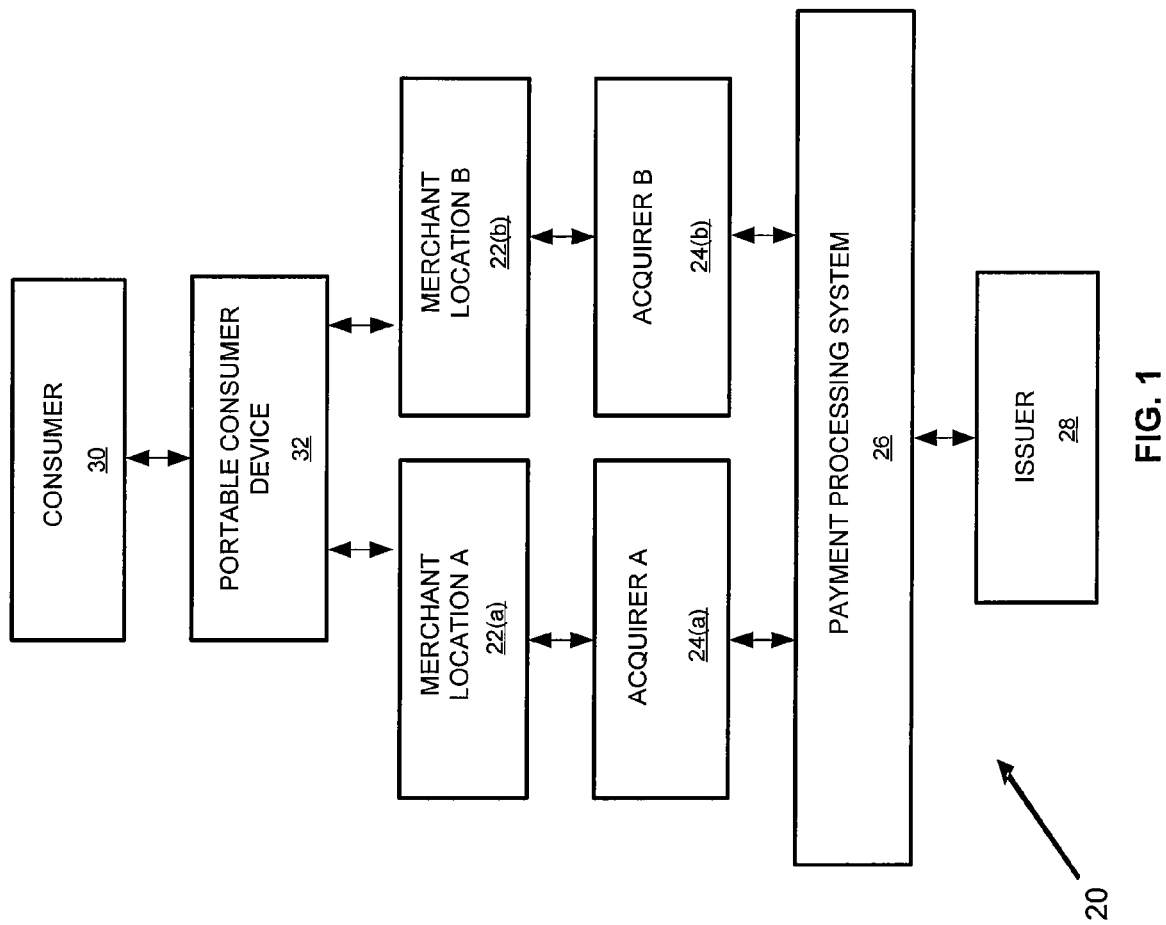
FIG. 1 is a functional block diagram illustrating the primary functional elements of a payment system that utilizes a standard portable consumer device.

The present invention is directed to an architecture and/or design for a dual use contactless smart card or payment device that may be used to conduct commerce transaction payments and to obtain access to a transit system or other venue. The contactless smart card or payment device may thus combine the capabilities for retail point of sale payment and transit system access and use. This permits the smart card or device to function as a payment mechanism (such as a credit/debit card) and as a transit system access card (i.e., as both a commerce transaction and access transaction device). In such an embodiment, the card may utilize a dynamic memory storage element. In such a storage element, the memory may be partitioned to include a section for storage of payment related functions, and a section partitioned for transit and other applications. The transit application may have pre-loaded data for one of or more transit agencies and have the ability to accept data for other agencies delivered via a programming or provisioning process. The transit application section may be configurable using the programming or provisioning process to permit provisioning of access control data, fare calculation data, or other relevant data used in one or more transit systems. In this way, the data storage section of the card, though limited, may be used in multiple transit system environments (and/or other venues to which access is desired) through updating or overwriting the data as required for the particular transit agency, venue, region, city, or geographical area.

Note that although the following discussion of the present invention focuses on the use of the invention to provide access to a transit system, it is intended to be used in other types of environments as well. Specifically, it is intended to be used for a generic transaction in which access is desired to a venue. In that regard, as used herein, an "access transaction", "venue access application", and similar terms are intended to include any transaction whereby a user uses a portable consumer device to access a particular place such as a train, concert venue, airplane, workplace, toll road, etc. Access is usually granted through an access device such as a gate or farebox at a train station. Although an "access transaction" could involve payment of some kind (e.g., deduction of a prepaid amount from a transit account), an "access transaction" is a different type of transaction than a "payment transaction", which includes a transaction that allows one to pay for a good or service at a point of sale. In a "payment transaction", a person does not use a portable consumer device to access a particular location, but is using the portable consumer device to pay for a good or service at a point of sale. Thus, in the description of the present invention, both "transit system" and "access transaction" are intended to represent a generic transaction in which access is desired to a particular building, system, or venue.

The contactless smart card typically communicates with a transit system fare collection mechanism using a short range communication method, such as a near field communications (NFC) capability. Examples of such NFC technologies include ISO standard 14443, RFID, Bluetooth™ and Infrared communications methods. The transit system specific data is stored in a dedicated storage region of the contactless smart card. Further, because the transit application data storage region may be of a dynamic nature, this permits transit system data to be written and erased as needed to make the most efficient use of the storage medium.

Prior to further discussing the use of a contactless smart card or other payment device that is capable of combined payment and transit (or other venue access) functions (and the possible scenario of an issuer of such a payment device or other party acting as an intermediary or trusted third party for transit system transactions), a brief description of the standard electronic payment operation will be presented. Typically, an electronic payment transaction is authorized if the consumer conducting the transaction is properly authenticated and has sufficient funds or credit to conduct the transaction. Conversely, if there are insufficient funds or credit in the consumer's account, or if the consumer's portable payment device is on a blacklist (e.g., it is indicated as possibly stolen), then an electronic payment transaction may not be authorized. In the following description, an "acquirer" is typically a business entity (e.g., a commercial bank) that has a business relationship with a particular merchant. An "issuer" is typically a business entity (e.g., a bank) which issues a portable consumer device such as a credit or debit card to a consumer. Some entities may perform both issuer and acquirer functions.

In standard operation, an authorization request message is created during or after a consumer purchase of a good or service at a point of sale (POS) using a portable consumer device (such as a credit or debit card). In this case, the portable consumer device may be a dual function smart card. The authorization request message can be sent from the POS terminal located at a merchant to the merchant's acquirer, to a payment processing system, and then to an issuer. An "authorization request message" can include a request for authorization to conduct an electronic payment transaction. It may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent data from being compromised.

FIG. 1 shows a payment system 20 that can be used with a standard payment card or portable payment device as part of a purchase and account management operation. The previously described dual function contactless smart card can be used with the system 20 as well as the previously described transit system, or other suitable venue. The system 20 includes merchant locations 22(a), 22(b) and acquirers 24(a), 24(b) associated with those merchant locations. The different merchant locations 22(a), 22(b) may be affiliated with a single merchant. A consumer 30 may purchase goods or services at the merchant locations 22(a), 22(b) using a portable consumer transaction payment device 32. The acquirers 24(a), 24(b) can communicate with an issuer 28 via a payment processing system 26.

The portable consumer device 32 may be in many suitable forms. For example, the portable consumer device can be a dual function contactless smart card that incorporates a data storage element for storing commerce transaction payment data (e.g., a BIN number, account number, etc.). In such a case, the smart card may incorporate both payment and transit functions, with the two types of data being functionally isolated from each other so that data used in one application is not accessible by the other application. The portable consumer device may also include a keychain device (such as the Speedpass™ commercially available from Exxon-Mobil Corp.), etc. The portable consumer device may also incorporate the ability to perform debit functions (e.g., a debit card), credit functions (e.g., a credit card), or stored value functions (e.g., a stored value card).

The payment processing system 26 may include data processing subsystems, networks, and other means of implementing operations used to support and deliver authorization services, exception file services, and clearing and settlement services for payment transactions. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing system 26 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. The payment processing system 26 may use any suitable wired or wireless network, including the Internet.

The merchant locations 22(*a*), 22(*b*) typically have point of sale (POS) terminals (not shown) that can interact with the portable consumer devices 32. Any suitable point of sale terminal may be used, including device (e.g., card) readers. The device readers may include any suitable contact or contactless mode of operation. For example, exemplary card readers can include RF (radio frequency) antennas, magnetic stripe readers, etc., to interact with the portable consumer devices 32.

As noted, both transit and payment applications have adopted the ISO 14443 standard for contactless smart cards. Further, because of the use of a common standard, there has developed a desire to utilize a bank-issued contactless payment card as both a commerce payment mechanism at a point of sale and as a transit fare payment mechanism (i.e., a transaction that permits access to a transit system or other type of venue). A first approach to satisfying the desire to combine both functions into a single contactless smart card may be to utilize a contactless payment card in its present form as issued (typically by a bank) within the transit environment. As presently implemented, a contactless payment application as used in commerce is an on-line transaction requiring end-to-end authentication and issuer (e.g., bank) approval/decline of the transaction. However, because of transaction speed considerations, transit fare payment and collection preferably requires an off-line transaction at the transit system gate or farebox. This is because, from the user's point of view, there is insufficient time in the transit environment (as well as in other environments, such as amusement parks and theaters) to wait for on-line issuer approval/disapproval of the fare transaction. Ideally, card validation should be processed at the smart card terminal/reader contained in the transit gate or farebox.

In addition to the transaction speed issue, there are security and other risks associated with the use of a contactless payment application card designed for on-line authorization in an off-line transaction. These sources of risk include, but are not limited to:

Authentication: the lack of card/terminal authentication creates a high potential for fraud through counterfeiting techniques;

Fraud: transit transactions are not authorized on-line in real time as designed. With such off-line transactions, the negative list (i.e., a list of rejected cards based on the unique card number) is the primary mechanism to deter fraud. This is sub-optimal since the negative list would presumably grow unbounded as more contactless payment cards are issued and/or wherein the use of counterfeit cards changes the unique card number on each use;

Fare Cost Calculation: the transit fare cannot be calculated at the gate or farebox without historical use information for the card. The cost of a transit transaction is dependent upon previous transaction history for the card. This historical data is not available, and cannot be written or resident on the contactless payment card as defined by financial institution standards;

Data Security/Storage: protection of cardholder data in transit fare collection systems may prove difficult. Tracking data in the form of the PAN (primary account number for the financial institution payment card) is the only security data currently available on a contactless payment card. As a result, transit fare collection systems would have to collect and store this data securely, which is not something transit fare collection systems do presently. If implemented, this requirement presents added cost and security concerns; and Certification: arranging for issuer (e.g., the banking organization) approval of the card reader mechanism in a transit environment may prove difficult to implement. Currently, contactless payment readers must be approved by financial payment organizations. This is not something transit system providers are required to do at present, and if implemented, adds an additional layer of cost and administrative overhead.

To overcome some of the above-mentioned problems which arise from the off-line use of a contactless banking card as defined by current financial institution standards, use of additional features of the contactless smart card or chip with data storage capability may be possible. However, using a defined file structure and encryption keys that are specific to one agency or group of cooperating agencies in a transit fare payment and collection environment raises other issues specific to that environment. Specifically, a transit patron is likely to utilize a multitude of transit systems based in different locations, so that a single transit agency may not be responsible for coordinating access and fare calculation data for all of the systems. This means that the contactless smart card may require provisioning with multiple sets of access control and fare calculation data. As the storage space on the card is limited and because transit agencies and systems change over time (as well as the data they require for access and fare calculations), the transit data stored on the card may need to be updated or changed on a regular basis, including deleting stale data or data not relevant to the transit system(s) currently being used.

Figure 2:
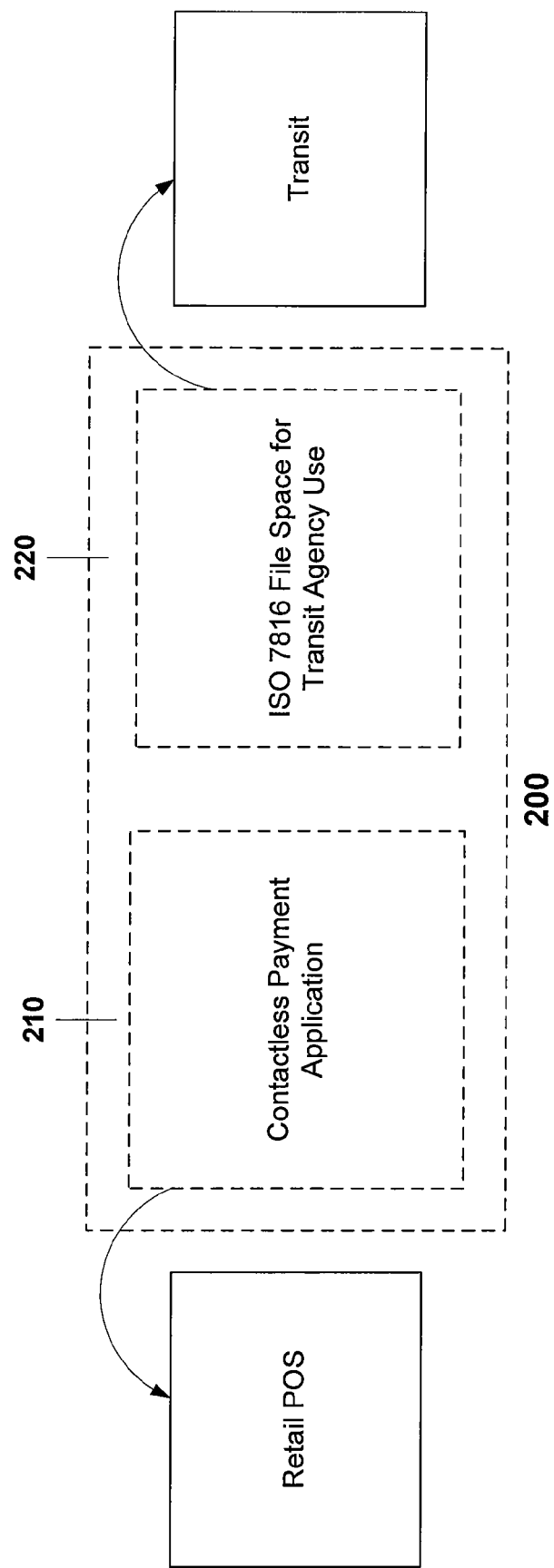
FIG. 2 is a pictorial representation of a first embodiment of the dual use contactless smart card or payment device of the present invention.

FIG. 2 is a pictorial representation of a first embodiment of the dual use contactless smart card or payment device 200 of the present invention. As shown in the figure, dual use contactless card 200 contains at least two sets of data: (1) a first set 210 representing data used in a contactless payment application; and (2) a second set 220 representing data used in a transit fare payment application (or other venue access application that does not utilize the data stored in the section dedicated to the payment application 210). The two sets of data are functionally isolated from each other, for example, by being stored in a different file structure. Data accessible to the payment application should not be accessible to others of the defined applications. Specifically, account and authentication data utilized in the payment application should not be accessible by the non-payment application(s).

The contactless payment application may be used as designed in an on-line process at retail point of sale locations. This is accomplished in contactless mode through the radio frequency (RF) interface inherent in ISO 14443 compliant smart cards. As noted, there will also be a set of data on the same contactless device that will be accessed through the contactless RF interface but be dedicated for transit agency or other venue access use.

Contactless smart card or payment device 200 is capable of transferring and receiving data using a near field communications capability, typically in accordance with a standardized protocol or data transfer mechanism (e.g., by virtue of ISO 14443 compliance). The near field communications capability is a short-range communications capability, such as RFID, Bluetooth™, infra-red, or other data transfer capability that can be used to exchange data between the card 200 and a local transit fare collection apparatus (gate, farebox, etc.).

In one embodiment, in the interest of maintaining security for a user's personal account data, the transit fare payment application data would preferably not contain data used in the authentication or verification processes for the payment card application. Thus, a user's PIN (personal identification number), PAN (primary account number), payment account number, or other private data used in the payment application would preferably not be stored in the data storage region utilized for transit data or other non-payment application data. Note that the dual function smart card may utilize ISO 7816 APDU commands and 3DES based card-to-reader security (or other suitable standards based commands/protocols) for access to the files on the card. The file structure may also allow the writing of data and/or control instructions to enable/disable the transit application features independently of the contactless payment application.

In terms of the previously noted disadvantages to using an as-issued payment card in a transit fare collection environment, the inventive dual function contactless smart card provides the following solutions:

Authentication: Card/reader mutual authentication (via 3DES, for example)—eliminates fraud potential;

Fraud: Card blocking bits or controls to disable transit application use and eliminate the possibility of an ever-expanding negative list;

Data Storage/Security: Processing transit uses with alternate card authentication data that may be linked externally to payment application authentication data minimizes compliance issues within transit systems;

Certification: Payment application card reader not used directly at transit access point (farebox). No issuer approval required for reader; and Fare Cost Calculation: Historical data held on the card could be used during a transaction to make fare calculation easier to process, either at the gate or the back-end central processing computer of the transit agency. Note that this may be implemented by writing data specific to a transaction as part of that transaction and then utilizing that data for a subsequent transaction.

Note that the issuing organization for the dual function card may be a bank or other financial organization that issues the payment/transit card, and/or acts as a clearing house for processing certain data associated with the payment and transit transactions (e.g., account reconciliation, billing, etc.). Note that it is also possible for another party to be in communication with the transit system and/or issuing organization in order to provide data that may be used by the issuing organization or the other party in the processing of transit transactions.

As indicated, the short range communications capability of the contactless smart card is utilized to transfer data between the card and the transit system's fare collection mechanism (e.g., gate, terminal, farebox, etc.). This communications channel is used to transfer information needed by the transit system to enable a user to have access to a transit site of the system at that site, and provide some or all of the fare calculation data required by the system. As will be described, the inventive system provides both an efficient method of utilizing the contactless smart card, and in addition, provides other benefits and advantages in the transit fare payment and collection environment.

Figure 3:
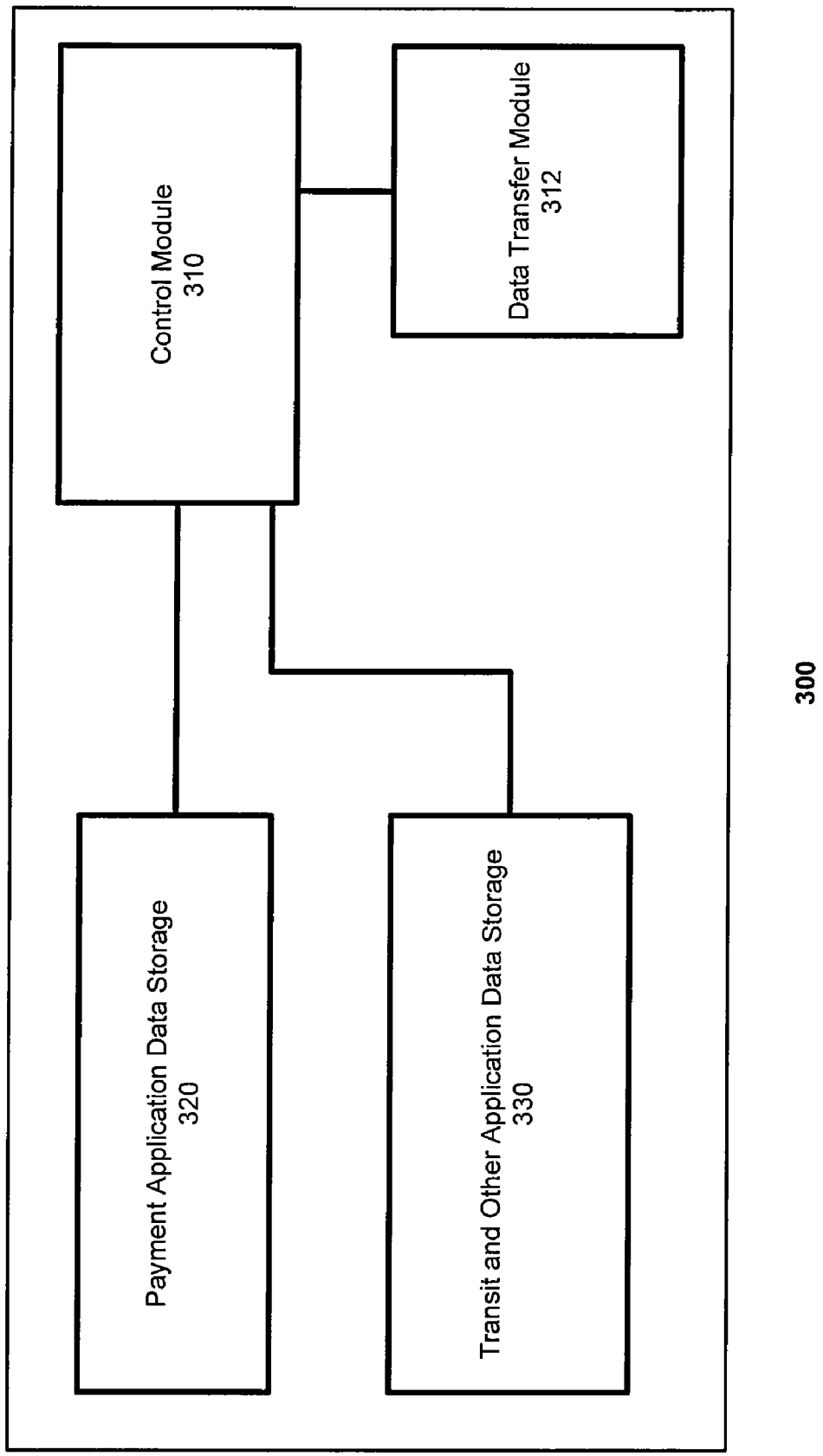
FIG. 3 is a functional block diagram of the dual use contactless smart card of FIG. 2.

FIG. 3 is a functional block diagram of the dual use contactless smart card (or payment device) of FIG. 2. As shown in the figure, dual use contactless smart card 300 will typically include a control module 310 (e.g., a microprocessor, processor element, state machine, or other logic element) that is configured to execute data processing operations for data stored in the card's data storage regions. Data transfer module 312 is utilized to exchange data between card 300 and a card reader or other data transfer element. For a contactless card, data transfer module 312 may utilize one or more wireless data transfer mechanisms, e.g., RF, Bluetooth™, Infra-Red, Optical, etc. Specifically, the data transfer module 312 may include, for example, an antenna for transmitting or receiving data, or optical emitters or receivers for receiving or transmitting data. As discussed with reference to FIG. 2, card 300 includes a data storage region 320 dedicated to storage of data for a payment application, and a second data storage region 330 dedicated to storage of data for transit fare payment and/or other venue access applications. Significantly, account identification, transaction authentication and/or other security data utilized in the payment application may be stored in data storage region 320, but is not stored in data storage region 330. Further, such payment-application specific data is not accessible to an application that utilizes data storage region 330.

An example of the typical manner in which a transit system user would utilize the inventive dual function smart card will now be described. In order to access a transit system using a form of payment other than cash, a user will typically require some form of identification and/or authentication to permit them to be recognized by the system as a valid user who is entitled to utilize the system's resources. This identification or authentication data may be in the form of a password, personal identification number or code (e.g., a primary account number (PAN)), and/or an element of an encryption process (such as a "key" used to calculate an authentication code that must be exchanged with another system element that validates the code). In addition, the transit system will preferably have access to information regarding the user's transit account, i.e., the amount of funds available so as to ensure that the calculated fare can be covered by the account balance.

In order to ensure a desired level of security, different transit systems may have different authentication requirements. In addition, most transit modes (e.g., bus, train, ferry)

will have different transit fares and fare computation requirements. As users move between different locations (cities, counties, states, etc.), they may encounter a large number and wide variety of transit system options. In order to utilize a contactless smart card for payment of transit fees, the user must have available to them the data required to access and utilize those transit systems. This suggests that the data storage section of the inventive smart card should include, at least in part, a flexible file and data storage structure that may be configured as desired to permit access to multiple and changing transit systems.

When a user in possession of the dual function contactless smart card passes within communications distance of a terminal associated with a transit system, the contactless smart card can communicate with the fare collection system via the near field communications capability; in this way the smart card can be used to identify the user, exchange authentication data (e.g., encryption keys or other forms of authentication/identification), provide data required for a fare computation, or provide other account related data to the collection system. Further, this data may be provided to the transit agency and/or transaction processing entity if needed for account management or other functions.

As mentioned, one means of performing an authentication process involves the exchange of "keys" to enable mutual authentication between two parties. In this case, the dual function contactless smart card may be provisioned with key data that can be used to identify the user (and possibly be linked to the user's account data for transaction processing purposes) and permit access to the transit system. Further, with different keys applicable to different transit systems, and possibly to the same system at different times, the data provisioning processes to be described may be used to provide the required key data needed by the user.

As discussed, the inventive dual function smart card may be used for both transaction payment and transit (or other venue access) functions. In such a case, the payment card issuer (or another entity) may function as an intermediary or trusted third party for the transit agencies and co-ordinate the provisioning of the smart card with the transit data. In addition, as noted, the smart card data storage may be configured to broadly contain two regions: a first region dedicated to data for use in a payment transaction (e.g., account data, PIN data, communication protocol data for use in the point of sale environment); and a second region dedicated to the transit and/or other application(s). The second region is preferably partitioned and managed to be isolated from the first region so that an application accessing one region would be excluded from accessing the other region. This would function to prevent a transit or other venue access application from accessing private account data such as the PIN, and hence help to ensure the security of such data.

Further, the file structure for the transit (or other venue access) application does not have to meet any standard definition or format. As such, no specific file or data format, or standardized structure is imposed. This is beneficial as it may be easier for each transit agency (or relevant venue or system) to utilize a file structure defined as part of their respective existing smart card systems. As a result, data storage/memory management may be performed in a manner that permits each agency to define the file requirements as dictated by their current fare collection systems. The payment and transit (or other) applications share the contactless chip or other data storage element, RF interface, and commands, but the data and operations of each application are independent and not accessible to the other application.

Further, the inventive smart card structure does not require the use of the cardholder PIN, PAN or other cardholder payment data to uniquely identify the transit account for fare payment. The transit application files will preferably contain a proxy to the standard cardholder authentication data and/or account information. A transit application (or other venue access application) identifying number may be cross-referenced with the PAN or other cardholder data at the central computer system of the transit agency, card issuer, or other third party processor.

In one embodiment, the transit specific (or other venue specific) data storage region would be partitioned to accommodate data for multiple transit (or other venue specific) systems. Allocation of the partitions and associated memory space may be facilitated by a bit-map identifying unused memory space that could be read by a transit system prior to storing data on the card. The bit-map or other form of index could be determined at the time of issuance, or updated to reflect present space allocation (taking into account additions and deletions of data). As noted, the transit (or other venue) specific region of the memory is preferably a free-form memory, wherein a dynamic file management protocol is utilized. In this approach, a flexible file structure and memory allocation is used to permit multiple transit systems to access and store data as needed. An example of such a dynamic file management system that is suitable for the present invention is one termed the Global Platform Storage Technology, developed by Visa, the assignee of the present invention. A description of such a data storage system is found in U.S. patent application Ser. No. 10/656,858, filed Sep. 5, 2003, entitled "Method and System for Facilitating Data Access and Management On A Secure Token", the contents of which is hereby incorporated by reference in its entirety. As described therein, one embodiment of the invention is directed to a system for facilitating data management on a secure token, comprising a client having a plurality of applications residing thereon, and a secure token having a storage architecture, wherein the storage architecture includes a directory and one or more attributes associated with the directory, wherein the one or more attributes associated with the directory are used to control access to the directory by the plurality of applications, one or more cell groups under the directory, each cell group having one or more associated attributes, wherein the one or more attributes associated with a cell group are used to control access to that cell group by the plurality of applications, and one or more cells under each cell group, each cell having one or more associated attributes, wherein the one or more attributes associated with a cell are used to control access to that cell by the plurality of applications.

The processes for establishing the data storage file structure, and the loading of transit system specific data for transit fare collection use (or to provide access to another venue or system) may occur during manufacture of the smart card by the card vendor (at card creation), by a bank or other issuing organization (at card personalization), or following card issuance to the cardholder (i.e. in the field). In the case of transit system data being loaded to the card prior to card issuance, the transit agency and card issuer would preferably exchange relevant data files so that each can correctly load data on the card and process the transactions that will be attempted using the card. For example, file structure definition, associated encryption keys, and pre-established fare products and data can be loaded on the card before it is issued to the cardholder. In such a situation, the cardholder may not be required to pre-register the card with the transit agency prior to transit use.

Figure 4:
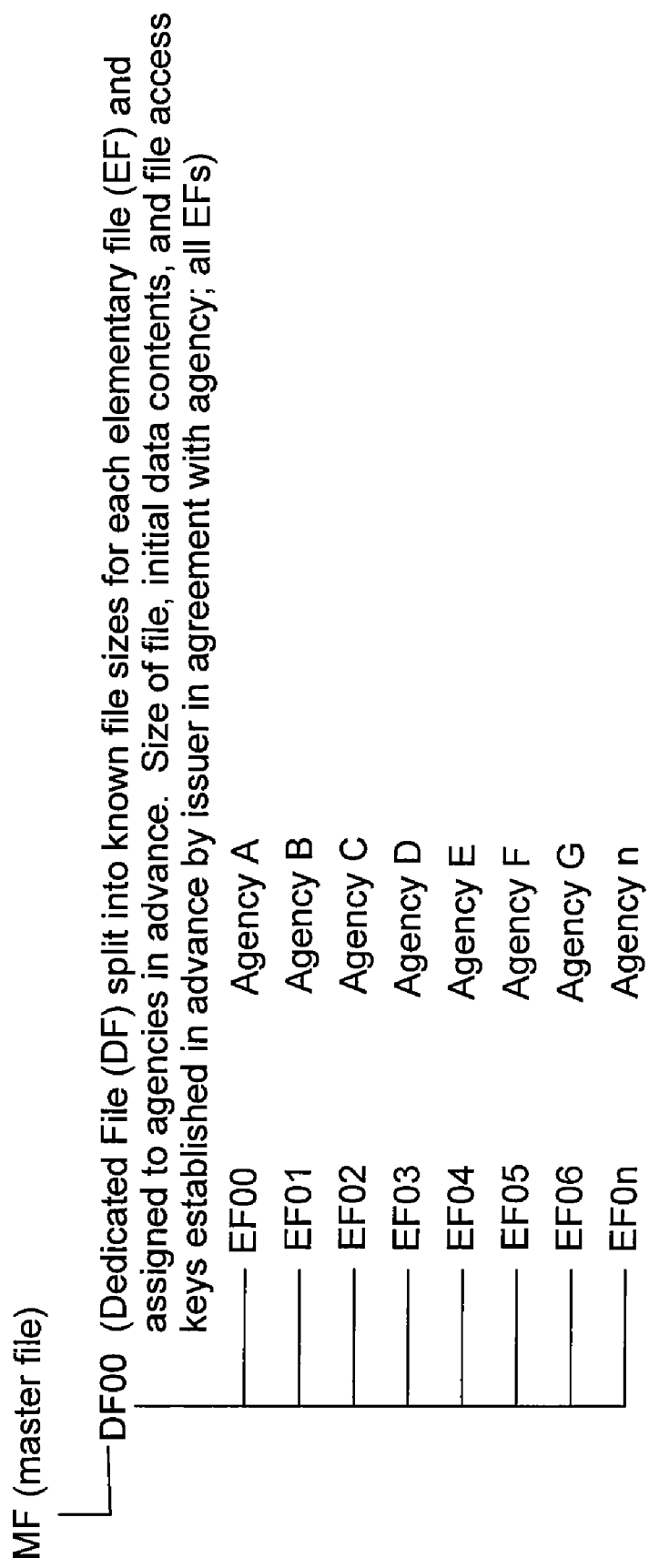
FIG. 4 is a diagram of a first example of a possible data file structure for the dual use contactless smart card of the present invention.

FIG. 4 is a diagram of a first example of a possible data file structure for the dual use contactless smart card or payment device of the present invention. In this example, the file structure and memory allocation operations are performed prior to card issuance. As shown in the figure, the transit data dedicated file (labeled "DF00" in the figure) is divided into multiple elementary file structures (labeled "EF00, . . . EF0n" in the figure), with each elementary file assigned to a designated transit agency in advance. In such a situation, the size of each file, initial contents, and access keys may be established in advance as the result of negotiations between the card issuer and the multiple transit agencies.

As an alternative, the file structure definition and the transit application specific data may be loaded to the transit data section of the card after issuance of the card. In one possible method, the transit system user may need to physically visit a transit system office to have encryption keys, files, and transit data loaded to the card. However, instead of requiring a user to visit one of what are typically a limited number of staffed transit offices, file loading and card pre-registration can be performed at an unmanned transit ticket vending machine or kiosk located at a transit station. In this scenario, certain aspects of the card files may still be established by the card issuer; however, the transit agency (or other venue/system) may establish other aspects, for example the initial contents of the file and/or certain security data (encryption keys, etc.).

Figure 5:
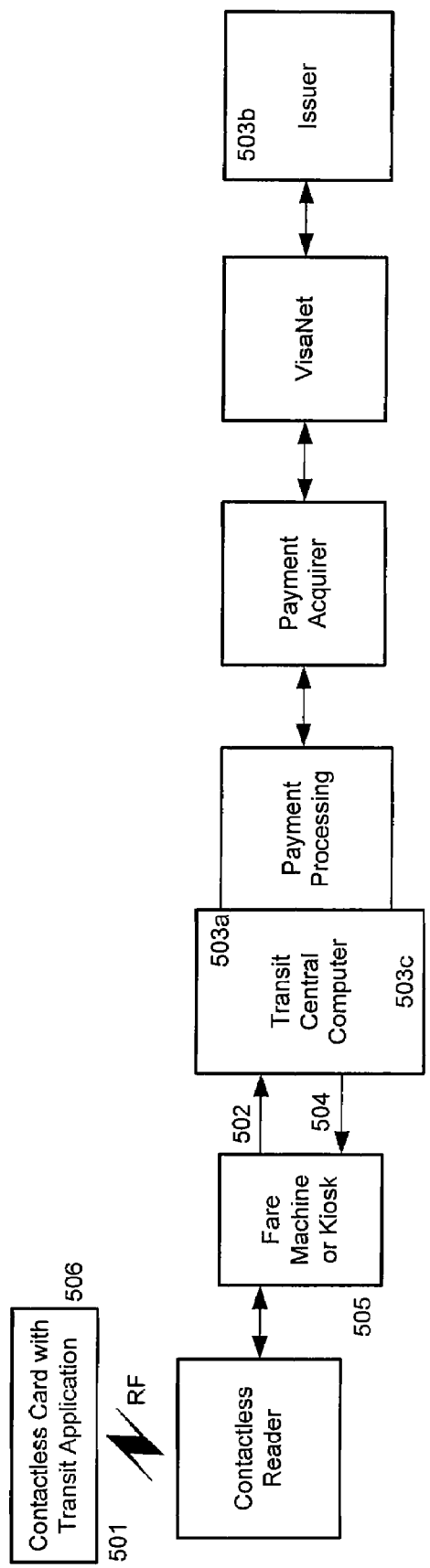
FIG. 5 is a conceptual block diagram showing the flow of data for a two-touch registration process that may be used with the dual use contactless smart card of the present invention.

In such a situation, card pre-registration and data loading could be accomplished by a two-touch process at a machine or kiosk. FIG. 5 is a conceptual block diagram showing the flow of data for a two-touch registration process that may be used with the dual use contactless smart card of the present invention. As shown in the figure, card registration may be accomplished by a two-part process:

(1) A first "touch" of the contactless smart card (element/step 501 in the figure) at a machine or kiosk would read basic cardholder payment application data from the contactless card and set up the pre-registration process (note that instead of physical contact, a method that otherwise causes communication to occur between the transit card reader and the card may be used; as indicated by the "RF" connection to the contactless reader element in the figure). The first "touch" of the card could read data from the contactless payment application data storage region, including the PAN (or a proxy of the PAN) and other desired cardholder data. An authorized payment transaction process could then take place through the issuer/banking network to establish card validity and pay for the transit account value.

If desired, this would establish that the transit agency (or other venue/system) in question is authorized to utilize the card's transit application data storage region, and identify the data file(s) assigned to that agency. In the case of a transit system, the machine or kiosk would then provide the relevant data (user tracking data, proxy data for user identification, etc.) to the transit system data processing system (elements/steps 502 and 503 in the figure). Transit system software would then establish the appropriate transit accounts (including, where applicable, a transit system account identifying number for a user), determine the transit file and product data needs, and create the transit data content to be written back to the transit application data storage section of the card on the next "touch".

For example, the transit system user's payment application PAN number could be validated by determining that it had not yet been assigned to a transit agency account. After validation the PAN could be assigned to a newly created database file. A payment transaction for a standard amount could them be performed between the transit agency and the card issuer. This would utilize the standard transaction payment system (discussed with reference to FIG. 1) to authorize the transaction that establishes an initial transit account balance. Authorization of the transaction by the card issuer establishes the validity of the card (as shown by elements/steps 503(*a*) and 503(*b*) in the figure). Note that a data table or other form of cross-reference could also be created at this time, indicating the cross reference between the payment application authentication data (e.g., PIN or PAN) and a unique transit application identification or account number (as shown by element/step 503(*c*) in the figure). The transit system would then send the machine or kiosk the data to be written to the card. This data could include the unique transit agency identification or account number, encryption keys, fare products, and other information required by the agency (as shown by element/step 504 in the figure); and (2) A second "touch" of the contactless smart card would cause the machine or kiosk to load the transit specific data to the transit application data storage section of the card. At this point, pre-registration and transit file set up is complete, and the card may be used for fare payment within the transit agency (as shown by elements/steps 505 and 506 in the figure).

Note that as part of the transit data provisioning process, it may be necessary to establish a process for card issuers to agree to make file space available on their cards, and for transit agencies to agree to allow the bank-issued dual function card to be used in their fare collection systems. This may involve resolving file and encryption key management issues between card issuers and transit agencies. As mentioned, one possibility is to have a third party act as a trusted agent for both the card issuer and transit agency. The trusted third party could hold and provide transit-specific encryption keys and data for issuers to personalize onto their cards. This provides a potential solution for issuers and transit agencies to exchange data and confidential information without having to maintain specific contractual relations with all current and future participants in the dual use card system.

As noted, data storage space on a contactless smart card is limited. One possible method for addressing this situation is for card data file space on the bank-issued card to be allocated to each transit agency or venue/system that desires to participate, in accordance with those agencies requirements. However, as more transit agencies or other venues desire to participate, the bank-issued card will likely run out of memory space. To address this problem, the issuer may allocate a standardized amount of file space to each participant, with that storage space defined in a specific way (e.g., data format, data type, etc.) so as to limit the amount of space available for, or needed by, each agency. This will provide an opportunity for more agencies to utilize the same bank-issued card within their transit systems.

However, when the data storage region of the card is preallocated by the card issuer, the card file space must be determined in advance for each transit agency or other venue/system that desires to participate. At present, low cost cards utilize static memory file space. Once initialized, the static card data space cannot be modified to add new agency file partitions or other data storage structures. This limitation would create a need to re-issue cards if a user wishes to utilize their card for a newly participating transit agency or other venue. But, card re-issuance is costly, considering that millions of cards may have been issued. To address this problem, the inventive smart card structure described herein may be utilized with data and file management techniques of the type described below:

(1) Use of a smart card file structure and data programming process that permits in-field updates and memory management to add new transit agency data as needed. Such a process would allow dynamic file management and memory configuration, space allocation, and key management, thereby providing a desired level of flexibility in updating the card after the card has been issued. An example of such a dynamic file management system that is suitable for use with the present invention is the aforementioned Global Platform Storage Technology, developed by Visa, the assignee of the present invention. A description of such a data storage system is found in U.S. patent application Ser. No. 10/656,858, filed Sep. 5, 2003, entitled "Method and System for Facilitating Data Access and Management On A Secure Token", the contents of which is hereby incorporated by reference in its entirety; and/or (2) Use of bit mapping to identify used/unused data storage space and file structures for allocation as needed after the card has been issued. In one embodiment, the transit file (or other venue access) application could have file space pre-allocated and protected with issuer keys at the time of personalization. File partitions could be allocated for multiple transit agencies, with not all known in advance. Once issued to the cardholder, a card pre-registration process used by the transit agency could access the bit map to find an unused file partition and access that data storage space (i.e., write data and configure the file structure as needed) for its dedicated use to load data and file access keys unique to that agency. An example of one implementation of such a process is described with reference to FIG. 6.

Figure 6:
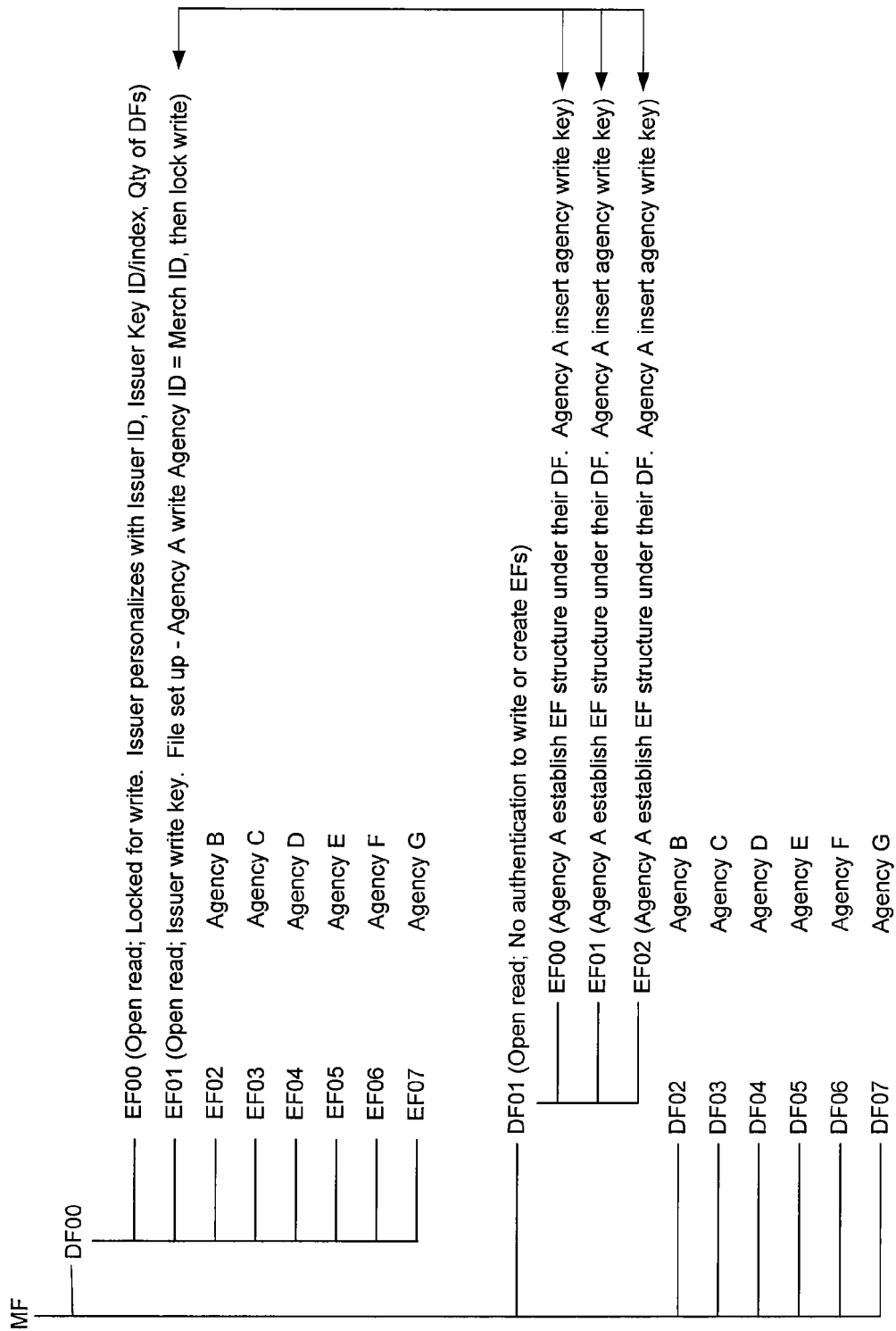
FIG. 6 is a diagram of a second example of a possible data file structure for the dual use contactless smart card of the present invention.

FIG. 6 is a diagram of a second example of a possible data file structure for the dual use contactless smart card of the present invention. In this example, certain aspects of the file structure and memory allocation are performed by the card issuer, with the transit agency then identifying available (non-allocated) storage space and utilizing that space and file structure for its transit fare payment data. In the example shown in the figure, the overall storage region is divided into multiple, dedicated file structures (elements DF01, . . . , DF07 in the figure, although either a greater or lesser number of such dedicated structures may be used), with one such structure assigned to each transit agency that provides data for the card. Each dedicated file structure is associated with multiple elementary file structures (elements EF00, . . . , EF07 in the figure, although again either a greater or lesser number of such structures may be used). A file structure, DF00 and associated elementary file structure (DF00:EF00) are used as an index/directory to the other dedicated and elementary file structures on the card. The index file structure is used by the transit agency to determine the next available set of files that may be used by that agency, and to write certain agency identifying data to the index file as part of the data file allocation process.

A transit agency wishing to provide agency data for the card would access the index file structure DF00 (the index data partition or directory) and read data contained in the EF00 file. This process may be performed at an initialization station as part of a pre-registration operation or at another agency specified location. The data in the EF00 file would be written to the file by the card issuer and may contain, among other data, an issuer identification number, index of encryption key data, and data regarding the number and/or locations on the card of the remaining DF file structures.

The agency would then open and read the subsequent EFxy files under the DF00 directory (i.e., DF00:EF01, etc.) to identify the next EFxy file that is not currently allocated to a transit agency. The result would be to identify a file DF00:EFxy that the agency could use to write its agency-specific data to the card. Note that this also would be used to identify the dedicated file structure DFxy that can be used by the new transit agency to store its data in accordance with a file structure and data format that it defines. The agency would write its agency identification data to the previously unused EFxy file and lock that file to protect against later data write operations (e.g., by authenticating the data a prescribed number of times). The associated DFxy file structure files, DFxy:EF00-EF07 (for example) would then be initialized by the agency in accordance with the agency's desired file structure in order to operate with the agency's fare payment system. The data write keys for those files (DFxy:EF00, etc.) would then be changed to agency specific write keys to protect against other agencies utilizing those files. The result is that each directory or dedicated file structure apart from DF00 is associated with a specific transit agency and has an associated set of files EF01, etc. that may be used to contain agency specific data, with the file structure and data formatted and organized as desired for that specific transit agency (as shown, for example, by the DF01 directory in the figure).

When a transit system user visits a transit system machine or kiosk, the contactless card reader would open the DF00: EF00, etc. files and read the merchant identification data. If none of the valid merchant identification data matched the identification data for the system, then the system would conclude that the card was not valid for that system. If one of the valid merchant identification data matched the identification data for the system, then the system would conclude that the card was valid on the system, and determine the associated directory for that system's data (e.g., DFxy). The machine or kiosk would then open the DFxy:EF00, etc. files associated with the system as required for the transit fare processing operations of that transit system, e.g., the policies, fare computation instructions, fare processing instructions, etc. As needed, the machine or kiosk would then use the transit system's data write keys to write data to the card in the appropriate files to update the transit agency and/or fare processing system records.

In accordance with the present invention there has been described a structure and architecture for a dual function contactless smart card or payment device that may be utilized in both commerce transaction payment and transit fare payment (or other venue access) environments. The data on the card may be provisioned by the card manufacturer, the card issuer, or post-issuance using the described two-touch process. The card may utilize a dynamic data storage model to permit the limited storage capacity of the card to be efficiently used to provide access to multiple and changing transit systems.

As mentioned, in addition to the transit system application described, the inventive contactless smart card may also be provisioned with data to permit access to other venues; these include, for example, amusement parks, theaters, toll stations, or other locations requiring specific access control and payment data. Payment for the transit fare or other access fee may be accomplished by linking the payment application account to the transit or other use. This linking may be performed using a proxy for the authentication and/or account data to ensure security for the payment application data.

It should be understood that certain elements of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A portable consumer device for use in conducting a transaction, comprising:
   an interface configured to communicate and exchange data with an element of a transaction processing system;
   a data storage element, the data storage element partitioned into at least two regions, wherein the at least two regions comprise
   a first region dedicated to data for a commerce transaction; and
   a second region dedicated to data for a different type of transaction than the commerce transaction; and
   a control module coupled to the interface and data storage element and configured to control the transfer of data between the interface and data storage element,
   wherein the second region is divided into a plurality of regions, with each region containing data for a different transaction, and
   further comprising a data file containing a plurality of sub-files, wherein each sub-file contains data identifying an agent for one of the different transactions.

2. The device of claim 1, wherein the second region contains data for a transit fare payment transaction.

3. The device of claim 1, wherein the second region is dynamically configurable.

4. The device of claim 1, wherein at least one of the plurality of regions is dynamically configurable.

5. The device of claim 1, wherein at least one of the plurality of regions contains data for a transit fare payment transaction.

6. The device of claim 1, wherein each of the plurality of regions further comprises a file structure and data configured in accordance with a requirement of an agent for the transaction associated with the region.

7. A contactless smart card device, comprising:
   a first data storage region dedicated to data for a payment transaction and including data for authenticating the payment transaction, the first data storage region protected to prevent access by other than the payment transaction; and
   a second data storage region dedicated to data for a different type of transaction than the payment transaction and not containing the data for authenticating the payment transaction, wherein the second data storage region is dynamically configurable,
   wherein the second data storage region is divided into a plurality of regions, with each region containing data for a different transaction, and
   wherein the contactless smart card device further comprises a data file containing a plurality of sub-files, wherein each sub-file contains data identifying an agent for one of the different transactions.

8. The smart card device of claims 7, wherein the second data storage region contains data for a transit fare payment transaction.

9. The smart card device of claim 7, wherein at least one of the plurality of regions is dynamically configurable.

10. The smart card device of claim 7, wherein at least one of the plurality of regions contains data for a transit fare payment transaction.

11. The smart card device of claim 7, wherein each of the plurality of regions further comprises a file structure and data configured in accordance with a requirement of an agent for the transaction associated with the region.

* * * * *